United States Patent
Moyer

(10) Patent No.: US 10,152,425 B2
(45) Date of Patent: Dec. 11, 2018

(54) CACHE ENTRY REPLACEMENT BASED ON AVAILABILITY OF ENTRIES AT ANOTHER CACHE

(71) Applicant: Advanced Micro Devices, Inc., Sunnyvale, CA (US)

(72) Inventor: Paul James Moyer, Fort Collins, CO (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 110 days.

(21) Appl. No.: 15/180,807

(22) Filed: Jun. 13, 2016

(65) Prior Publication Data
US 2017/0357446 A1 Dec. 14, 2017

(51) Int. Cl.
G06F 12/0891 (2016.01)
G06F 12/0897 (2016.01)
G06F 12/128 (2016.01)

(52) U.S. Cl.
CPC ...... *G06F 12/0897* (2013.01); *G06F 12/0891* (2013.01); *G06F 12/128* (2013.01); *G06F 2212/1016* (2013.01); *G06F 2212/1028* (2013.01)

(58) Field of Classification Search
CPC . G06F 12/0811; G06F 12/0897; G06F 12/128
See application file for complete search history.

(56) References Cited

U.S. PATENT DOCUMENTS

| 5,812,816 A | 9/1998 | Parady | |
|---|---|---|---|
| 9,058,272 B1* | 6/2015 | O'Bleness | G06F 12/0831 |
| 2006/0155934 A1* | 7/2006 | Rajamony | G06F 12/0804 711/134 |
| 2007/0186045 A1* | 8/2007 | Shannon | G06F 12/128 711/133 |
| 2008/0091880 A1* | 4/2008 | Vishin | G06F 12/0806 711/122 |
| 2010/0064107 A1 | 3/2010 | Eddy et al. | |
| 2010/0235584 A1 | 9/2010 | Guthrie et al. | |
| 2011/0093654 A1 | 4/2011 | Roberts et al. | |
| 2015/0026404 A1 | 1/2015 | Lilly et al. | |
| 2016/0055100 A1* | 2/2016 | Loh | G06F 12/128 711/122 |
| 2016/0283380 A1* | 9/2016 | Vinod | G06F 12/0833 |

OTHER PUBLICATIONS

Zahran et al. "Non-Inclusion Property in Multi-level Caches Revisited." Jun. 2007. IJCA. vol. 14. No. 2. pp. 1-10.*

(Continued)

*Primary Examiner* — Nathan Sadler

(57) ABSTRACT

A processing system selects entries for eviction at one cache based at least in part on the validity status of corresponding entries at a different cache. The processing system includes a memory hierarchy having at least two caches, a higher level cache and a lower level cache. The lower level cache monitors which locations of the higher level cache have been indicated as invalid and, when selecting an entry of the lower level cache for eviction to the higher level cache, selects the entry based at least in part on whether the selected cache entry will be stored at an invalid cache line of the higher level cache.

16 Claims, 4 Drawing Sheets

(56) References Cited

OTHER PUBLICATIONS

Speight et al. "Adaptive Mechanisms and Policies for Managing Cache Hierarchies in Chip Multiprocessors." Jun. 2005. IEEE. ISCA'05.*
Jacob et al. Memory Systems: Cache, DRAM, Disk. Elsevier. 2008. pp. 301-312.*
International Search Report and Written Opinion dated Mar. 9, 2017 for Application No. PCT/US2016/051661, 14 pages.

* cited by examiner

CACHE ENTRY REPLACEMENT BASED ON AVAILABILITY OF ENTRIES AT ANOTHER CACHE

BACKGROUND

Field of the Disclosure

The present disclosure relates generally to processors and more particularly to cache management at a processor.

Description of the Related Art

To support execution of instructions, a processing system typically includes a memory subsystem having memory modules to store data to be accessed by the executing instructions. The memory subsystem can be organized into a memory hierarchy having main memory at the top of the hierarchy to store a larger quantity of data that can be accessed by the executing instructions, and one or more caches at lower levels of the memory hierarchy to store subsets of the data stored at main memory. Typically, the lower data is stored in the memory hierarchy the more quickly it can be accessed by the processor. To further enhance processing efficiency, the processing system can implement a memory management protocol that governs the particular set of data stored at each level of the memory hierarchy. For example, the processing system can implement a memory management protocol that moves data that has recently been requested for access to lower levels of the memory hierarchy, with the expectation that the data will be accessed again by the processor in the near future, and moves data that has not been accessed recently to higher levels of the memory hierarchy. However, this general memory management protocol can result in frequent movement of data between levels of the memory hierarchy, impacting both processing efficiency and power consumption of the processing system.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-5 illustrate techniques for improving memory management efficiency at a processing system by selecting entries for eviction at one cache based at least in part on the validity statuses of corresponding entries at a different cache. To illustrate, the processing system can include a memory hierarchy having at least two caches, a higher level cache (closer to main memory in the memory hierarchy) and a lower level cache (closer to a processor core of the processing system). As data at an entry of the higher level cache is moved to an entry of the lower level cache, the entry of the higher level cache is marked as having a validity status of "invalid," thereby indicating that the entry is available to store incoming data at the higher level cache. The lower level cache monitors which locations of the higher level cache have been indicated as invalid and, when selecting an entry of the lower level cache for eviction to the higher level cache, selects the entry based at least in part on whether the selected cache entry will be stored at what is at that time an invalid cache line of the higher level cache. The processing system thereby reduces the number of evictions at the higher level cache, which results in reduced power consumption and improved memory efficiency.

Figure 1:
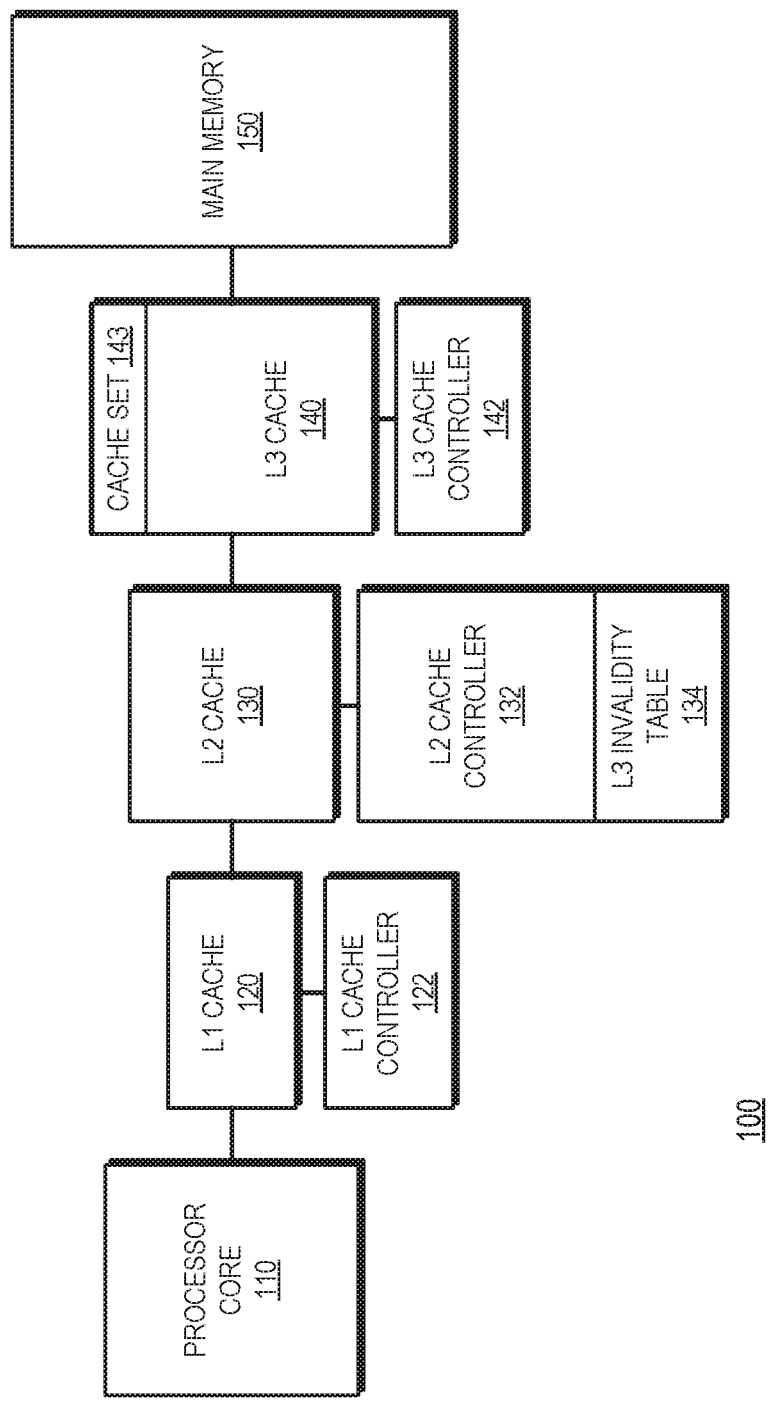
FIG. 1 is a block diagram of a processing system employing a memory hierarchy wherein one cache selects entries for replacement based on the validity status of entries at another cache in accordance with some embodiments.

FIG. 1 illustrates an example of a processing system 100 configured to track, at a given cache level, invalid cache entries at a different level of cache for use in a cache replacement policy at the given cache level in accordance with some embodiments. The processing system 100 can be employed in any of a number of devices, such as a personal computer, workstation, mobile device such as a smartphone, a video game console, smart TV, and the like. The processing system 100 includes a processor core 110, multiple levels of cache (e.g., L1 cache 120, L2 cache 130, L3 cache 140), and a main memory 150. In some embodiments, the processor core 110 and the multiple levels of cache, including their associated cache controllers, form a processor incorporated on a single semiconductor die, with the main memory 150 incorporated on a separate semiconductor die.

The processor core 110 includes one or more instruction pipelines to execute instructions, thereby carrying out tasks on behalf of an electronic device. While the processor core 110 may have some amount of integral memory, for example, in the form of a register file, such memory is typically limited in storage capacity. Accordingly, in order to execute instructions, the processor core 110 stores and retrieves data from the memory hierarchy of the processing system 100, including the L1 cache 120, L2 cache 130, L3 cache 140, and main memory 150. In particular, in the course of executing instructions, the processor core 110 generates operations, referred to as memory access requests, to store (a store operation) data at or load (a read operation) data from the memory hierarchy. The L1 cache 120, L2 cache 130, L3 cache 140, and main memory 150 work together to satisfy the memory access requests, as described further herein.

The L1 cache 120 is a memory module that stores data for access by the processor core 110. In at least one embodiment, the L1 cache 120 is composed of a set of entries, each of which can store an associated unit of data referred to as a cache line. The L1 cache controller 122 is a module configured to receive memory access requests for data from the processor core 110 and search the L1 cache 120 to determine if one of the cache entries stores a cache line associated with the memory address targeted by the memory access request. If the requested cache line is found in the L1 cache 120, a cache hit has occurred. In the event of a cache hit, the L1 cache controller 122 satisfies the memory access request by, in the case of a read operation, providing the requested cache line from the L1 cache 120 to the processor core 110 or, in the case of a write operation, storing the write data to the cache entry. If the requested cache line is not found in the L1 cache 120, a cache miss has occurred. In the event of a cache miss at the L1 cache 120, the L1 cache controller 122 provides the memory access request to the L2 cache 130.

Similar to the L1 cache 120, the L2 cache 130 is a memory that includes a set of entries, each of which can store an associated cache line. The L2 cache controller 132 is a module configured to receive memory access requests from the L1 cache controller 122 in response to cache misses at the L1 cache 120. In response to receiving a memory access request, the L2 cache controller 132 identifies whether one of the cache entries of the L2 cache 130 stores data associated with the memory address targeted by the memory access request. If so, the L2 cache controller 132 identifies a cache hit, and provides the requested data from the L2 cache 130 to the L1 cache 120. If the requested data is not found in the L2 cache 130, the L2 cache controller identifies a cache miss and provides the memory access request to the L3 cache 140.

As with the L1 cache 120 and L2 cache 130, the L3 cache 140 is a memory including a set of entries, with each entry configured to store a cache line. The L3 cache controller 142 is configured to receive memory access requests from the L2 cache controller 132. In response to receiving a memory access request, the L3 cache controller 142 identifies whether an entry of the L3 cache 140 stores data associated with the memory address targeted by the memory access request. In the event of a cache hit, the L3 cache controller 142 provides the requested data from the L3 cache 140 to the L2 cache 130, which stores the data and in turn provides the data to the L1 cache 120, which satisfies the memory access request as described above. In the event of a cache miss at the L3 cache 140, the L3 cache controller 142 provides the memory access request to the main memory 150. The main memory 150 retrieves the cache line at the memory address targeted by the request and provides the cache line to the L3 cache 140, which in turn provides the cache line to the L2 cache 130 for provision to the L1 cache 120, where the memory access request is satisfied. Thus, as described above, the memory access request traverses the memory hierarchy until the requested data is found. The requested data is then transferred to the L1 cache 120, wherein the memory access request is satisfied.

In some embodiments, each of the L1 cache 120, L2 cache 130, and L3 cache 140 is a set associative cache, wherein each cache is divided into a number of sets. Each set includes a number of ways, with each way corresponding to a cache entry that can store a cache line. Each set only stores a cache line associated with subset of memory addresses, wherein the subset associated with a set is identified by the corresponding cache controller based on a portion of the memory address referred to as the index. By employing set associativity, the caches 120, 130, and 140 facilitate relatively quick identification of cache misses and cache hits. Further, in some embodiments the L3 cache 140 is larger than the L2 cache 130, such that it can employ a larger index size for each of its sets.

In some embodiments, the caches 120, 130, and 140 are sized such that they typically are unable to store, at a given point in time, all the data that is requested, or may be requested, by the processor core 110, thereby requiring data to be transferred through the memory hierarchy as described above. To ensure data coherency and efficient transfer of data through the memory hierarchy, each of the cache controllers 122, 132, and 142 implements a replacement policy to identify if there is an entry in a set available to store a received cache line and, if not, to select one of the entries in the set for replacement. The availability of a cache entry is indicated by status information associated with the entry, referred to as the valid status of the entry. In particular, a cache line having an invalid validity status (referred to herein as an invalid cache line) is one that is available to store data and a cache line having a valid validity status (referred to herein as a valid cache line) is one that is not available to store data unless it is replaced. To replace a valid cache line at an entry with an incoming cache line, the cache controller for the cache first evicts the valid cache line by transferring it to one or more other levels of the memory hierarchy, and then stores the incoming cache line at the entry.

To illustrate, in response to a reset of the processing system 100, all cache lines in each of L1 cache 120, L2 cache 130, and L3 cache 140 are set by their respective cache controller to an invalid state. As a cache entry is populated with a cache line retrieved from main memory 150, the corresponding cache controller sets the cache entry to a valid state. A cache way containing a cache line that has been set to an invalid state may receive an incoming cache line, which will displace or overwrite the invalid cache line. When a cache receives a cache line to be stored, it must select a cache way where the cache line is to be stored. If the cache set associated with the incoming cache line has room available (i.e., has one or more cache ways indicated as containing invalid cache lines), the incoming cache line will be stored at one of the invalid ways. However, if all cache ways in the set associated with the incoming cache line are indicated as valid, the cache controller selects a cache line of the set associated with the new cache line to be evicted to make room for the incoming cache line.

The particular criteria employed by a cache controller to select the cache line for replacement is referred to as a replacement policy. For example, the cache controller 122 may implement a replacement policy at the cache 120 wherein it selects for eviction the least recently used cache line (that is, the cache line that was least recently the target of a memory access operation) in the cache set associated with the incoming cache line.

In some embodiments, the L2 cache controller 132 implements a replacement policy based on the location of invalid cache lines at the L3 cache 140. In particular, the L2 cache controller 132 can select for eviction a cache line that, when transferred to the L3 cache 140 for the eviction, is likely to be stored at an invalid cache way. The L3 cache 140 therefore does not have to evict a valid cache line in order to make room for the incoming cache line from the L2 cache 130. Thus, by selecting a cache line for eviction based at least in part on the location of invalid cache lines at the L3 cache 140, the L2 cache controller 132 can reduce the number of evictions at the L3 cache, conserving power and improving memory efficiency.

To illustrate, in operation, processor core 110 executes a memory access operation. The processor core 110 requests the data (a cache line) from L1 cache controller 122, which searches the L1 cache 120 for the requested cache line. If the requested cache line is found in the L1 cache 120, the requested cache line is read to the processor core 110. If the requested cache line is not found in the L1 cache 120, the L1 cache controller 122 requests the cache line from the L2 cache controller 132. The L2 cache controller 132 searches the L2 cache 130 for the requested cache line. If the requested cache line is found in the L2 cache 130, the L2 cache controller 132 copies the requested cache line to the L1 cache 120, from which the L1 cache controller 122 reads the requested cache line to the processor core 110.

If the requested cache line is not found in the L2 cache 130, the L2 cache controller 132 requests the cache line from the L3 cache controller 142. The L3 cache controller 142 searches the L3 cache 140 for the requested cache line. If the requested cache line is found in the L3 cache 140, the L3 cache controller 142 copies the requested cache line to the L2 cache 130 and changes a status bit in the retained copy of the requested cache line resident in the L3 cache 140 to an invalid state. The L2 cache controller 132 updates the L3 invalidity table 134 to indicate that the requested cache line in the L3 cache 140 has been set to an invalid state. The L2 cache controller 132 searches the L2 cache 130 for a cache set to which it can copy the requested cache line that has been copied from the L3 cache 140.

If no cache sets in the L2 cache 130 are available to store the requested cache line, the L2 cache controller 132 will select a cache line from a cache set for eviction and replacement. In making its selection, the L2 cache controller 132 will consult the L3 invalidity table 134 to determine whether any cache lines residing in the cache sets with which the incoming cache line are associated with cache sets in the L3 cache 140 containing invalid cache lines. If so, such cache lines will be preferred for eviction from the L2 cache 130 to the L3 cache 140, because their eviction to the L3 cache 140 will result in the displacement of an invalid cache line in the L3 cache 140, and therefore will not require eviction of valid data from the L3 cache 140. Such a preference may be considered by the L2 cache controller 132 among other factors, such as the least recently used cache line residing in the L2 cache 130. For example, the L2 cache controller 132 can assign to each cache line an age value, and adjust the age value based on a number of criteria, including whether the cache line is associated with an invalid cache line at the L3 cache 140, whether the cache line is the target of a memory access operation, and the like. The age value for a given cache line thus reflects, for that cache line, the combination of all the different replacement policy criteria. When selecting a cache line of a set for eviction, the L2 cache controller 132 can select the cache line based on a comparison of the age values for the cache lines in the set.

Once a cache line has been evicted from the L2 cache 130 to the L3 cache 140, the L2 cache controller 132 copies the incoming requested cache line from the L3 cache 140 to the L2 cache 130. Once the requested cache line has been copied to the L2 cache 130, the L2 cache controller 132 copies the requested cache line to the L1 cache 120. The L1 cache controller 122 then provides the requested cache line to the processor core 110.

It will be appreciated that different cache controllers of the processing system 100 may implement different replacement schemes at their respective caches. For example, the L2 cache controller 132 can select entries for replacement at the L2 cache 130 based at least in part on the validity status of entries of the L3 cache 140 as described above. In contrast, the L1 cache controller 122 can select entries for replacement at the L1 cache 120 without regard to the validity status of entries at the L2 cache 130 or the validity status of entries at the L3 cache 140. Implementing such different replacement schemes at the different cache controllers can improve overall memory access efficiency at the processing system 100.

Figure 2:
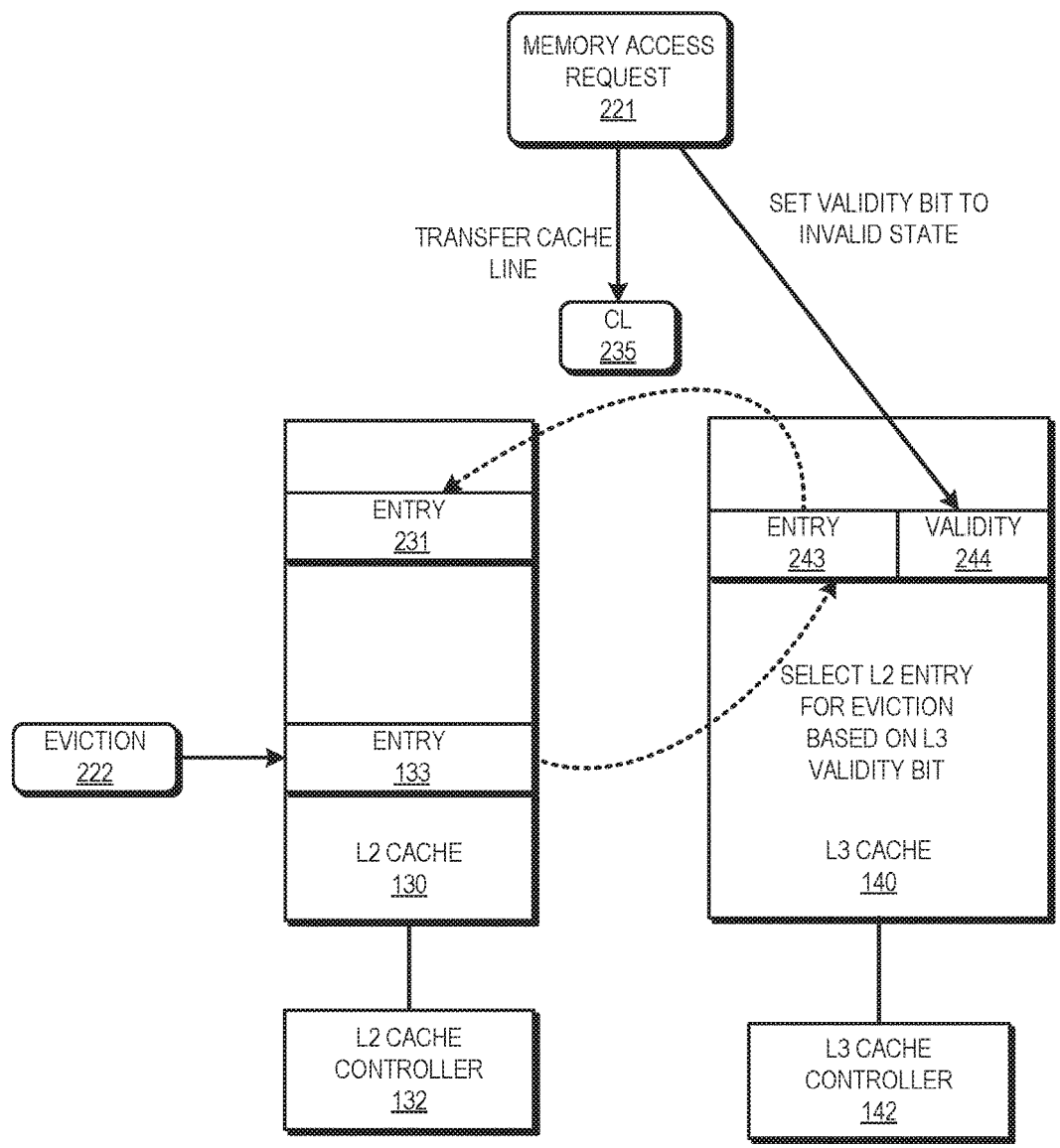
FIG. 2 is a block diagram of an example of the processing system of FIG. 1 transferring data from a higher level of cache to a lower level of cache in accordance with some embodiments.

FIG. 2 illustrates an example of a cache line at the L2 cache 130 being selected for replacement based on a validity state of the L3 cache line to which it will be evicted in accordance with some embodiments. In the illustrated example, the L3 cache 140 receives a memory access request 221, requesting a cache line 235, stored at cache entry 243. In response to the memory access request 221, the L3 cache 140 provides the cache line 235 to the L2 cache 130, which stores the cache line 235 at an entry 231. In addition, in response to the memory access request 221, the L3 cache 240 sets a validity bit 244 for the cache entry 243 to an invalid state, indicating that the data stored at the cache entry 243 is invalid and eligible for replacement.

Subsequent to the memory access request 221 and the validity bit 244 being set to an invalid state, the L2 cache controller 132 identifies an eviction 222—that is, the L2 cache controller 132 determines that it must evict data from one of its entries to accommodate data being received from another cache, such as the L3 cache 140, the L1 cache 120, and the like. In response to identifying the eviction 222, the L2 cache controller 132 identifies an entry for replacement based at least in part on whether the identified entry will be stored at an entry of the L3 cache 140 that is in an invalid state. In the depicted example, the L2 cache 130 includes an entry 133 that, when its data is evicted, the data will be stored by the L3 cache 140 at the cache entry 243. That is, the memory address associated with the data at the entry 133 is such that, if that data is provided to the L3 cache 140 by the L2 cache 130, the L3 cache 140 will store the data at the cache set 243. Further, as explained above, the validity bit 244 for the cache entry 243 was previously set to an invalid state in response to the memory access request 221. Accordingly, in response to identifying that the cache entry 243 is indicated by the validity bit 244 as storing invalid data, the L2 cache controller 132 selects the entry 133 for replacement, and provides the data stored at the entry 133 to the L3 cache 140.

In response to receiving the data from the L2 cache 130, the L3 cache controller 142 selects the cache entry 243 to store the data. Because the cache entry 243 is indicated as being in the invalid state, the L3 cache 140 does not have to evict any valid data to accommodate the incoming data. Thus, by selecting data for eviction based on whether the data will be stored at an entry of the L3 cache 140 that is indicated as invalid, the L2 cache 130 reduces the number of evictions at the L3 cache 140 and improves overall memory efficiency at the processing system 100.

Figure 3:
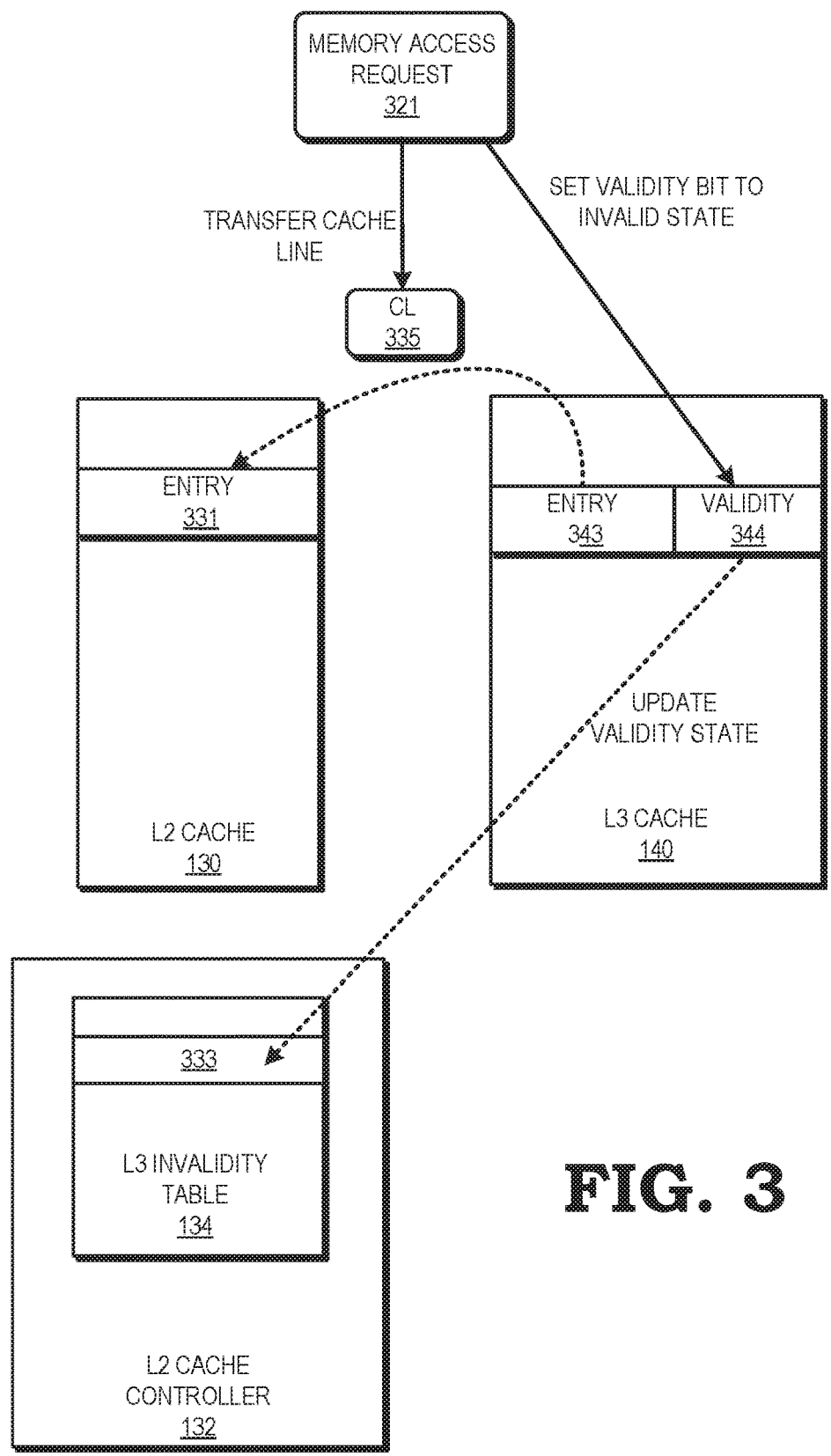
FIG. 3 is a block diagram of an example of the processing system of FIG. 1 tracking, at a lower level of cache, which data has been transferred from a higher level of cache to the lower level of cache in accordance with some embodiments.

As described above with respect to FIG. 1, in some embodiments the L2 cache controller 132 keeps track of the validity status of entries of the L3 cache 140 in an L3 invalidity table 134. FIG. 3 illustrates an example of the L2 cache controller 132 updating the L3 invalidity table 134 in response to a change in validity status of an entry of the L3 cache 140 in accordance with some embodiments. In the depicted example, the L3 cache 140 receives a memory access request 321 that represents a request for the L3 cache 140 to transfer a cache line 335 to the L2 cache 130. In response, the L3 cache controller 142 identifies that the cache line 335 is stored at an entry 343, and transfers the data stored at the entry 343 to the L2 cache 130, which stores the data at an entry 331. In addition, the L3 cache controller 142 sets a validity bit 344 for the entry 343 to an invalid state, to indicate that the data stored at the entry 343 is not valid.

In response to setting the validity bit 344 for the entry 343 to the invalid state, the L3 cache controller 142 sends a message (not shown at FIG. 3) to the L2 cache controller 132, indicating that the entry 343 is invalid. In response, the L2 cache controller 132 identifies an entry 333 of the L3 invalidity table 134 as corresponding to the entry 343 of the L3 cache 140. The L2 cache controller 132 updates the entry 333 to indicate that the entry 343 is invalid, and therefore data likely to be stored at the entry 343 should be prioritized for eviction from the L2 cache 130. The L2 cache controller 132 can continue to update the entry 333 in response to subsequent changes in the validity of data stored at the entry 343. By storing the validity state of entries of the L3 cache 140 at the L3 invalidity table 134, the L2 cache controller can quickly incorporate the validity state when identifying data for replacement at the L2 cache 130.

Figure 4:
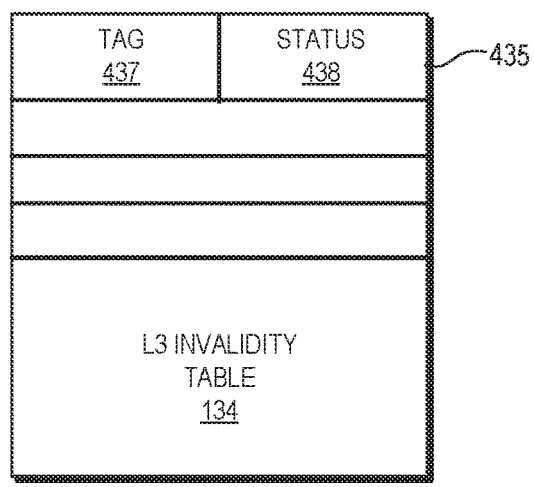
FIG. 4 is a block diagram of an invalidity table employed at a cache of FIG. 1 in accordance with some embodiments.

FIG. 4 illustrates an example of the invalidity table 134 of FIG. 1 in accordance with some embodiments. In the illustrated example, the invalidity table 134 includes a plurality of entries (e.g., entry 435), with each entry including a tag field 437 that stores the tag of an entry at the L3 cache 140. Each entry of the invalidity table 134 also includes a status field 438 indicating the validity status of the entry corresponding to the tag. In at least one embodiment, the status field for an entry is set to the invalid state when the tag value is stored at the tag field in response to the cache entry corresponding to the tag being transferred from the L3 cache 140 to the L2 cache 130. The L2 cache controller 132 can update the status field to the valid state in response to specified events, such as an indication that a new cache line is being stored at the cache line of the L3 cache 140 corresponding to the tag value. The L3 invalidity table 134 thereby maintains an up-to-date record of the validity status of the cache lines of the L3 cache 140, and can be used by the L2 cache controller 132 to select cache lines of the L2 cache 130 for eviction as described above.

Figure 5:
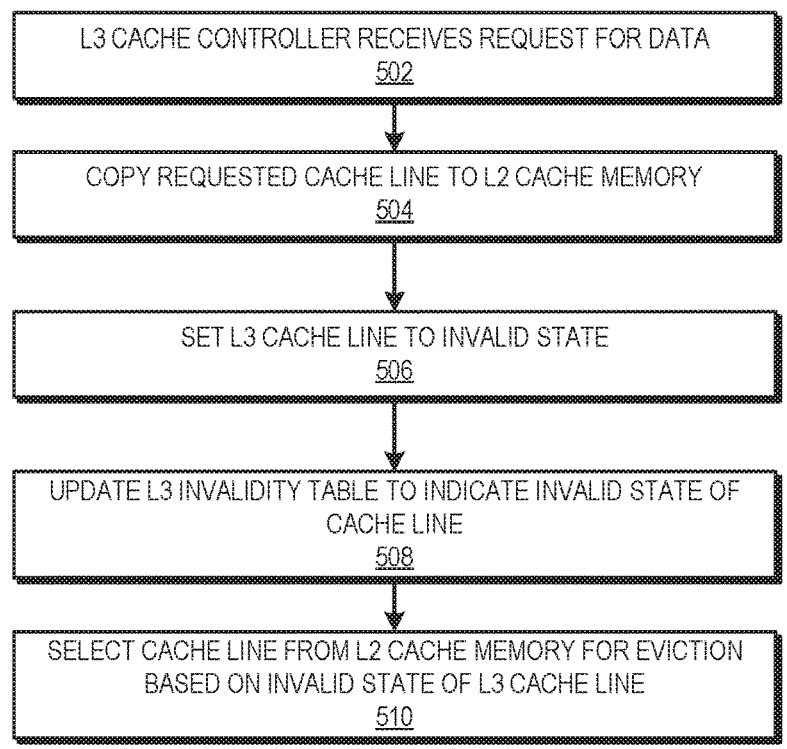
FIG. 5 is a flow chart of a method of tracking validity status of entries at one level of cache to select entries for eviction data at a different level of cache in accordance with some embodiments.

FIG. 5 illustrates a method 500 of selecting a cache line for eviction from a first cache to a second cache based on an invalid state of a cache line in a cache set of the second cache associated with the cache line selected for eviction. At block 502, the L3 cache controller receives a request for data. If the requested cache line is found in the L3 cache, at block 504 the L3 cache controller copies the requested cache line to the L2 cache. At block 506, the L3 cache controller sets the retained copy of the cache line in the L3 cache to an invalid state. At block 508, the L2 cache controller updates the L3 invalidity table to indicate that the retained copy of the cache line in the L3 cache is invalid. At block 510, when the L2 cache controller selects a cache line from the L2 cache for eviction to make room for incoming data, the L2 cache controller selects a cache line from the L2 cache for eviction based in part on the invalid state of a cache line in the L3 cache. Although the method 500 has been described with respect to an example embodiment between an L3 cache and an L2 cache, the method 500 applies to other memory hierarchies including multiple levels of caches.

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

The particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. In a processing system, a method comprising:
    transferring first data from an entry of a first cache of the processing system to an entry of a second cache of the processing system;
    setting, at the processing system, a validity status of the entry of the first cache to an invalid state in response to transferring the first data from the entry of the first cache to the entry of the second cache;
    selecting, at the processing system, second data at the second cache for replacement in response to the validity status of the entry of the first cache indicating the invalid state; and
    transferring the second data from the second cache to the first cache in response to selecting the second data for replacement.

2. The method of claim 1, further comprising:
    selecting the second data at the second cache for replacement in response to a memory access request received at the second cache subsequent to transferring the first data from the entry of the first cache to the entry of the second cache.

3. The method of claim 1, further comprising:
    storing the validity status of the entry of the first cache at a cache controller of the second cache, wherein selecting the second data comprises selecting the second data based on the stored validity status.

4. The method of claim 3, further comprising:
    updating the stored validity status in response to an indication that data has been stored at the entry of the first cache.

5. The method of claim 1, wherein the selecting the second data at the second cache for replacement is further based on an age value of the entry of the second cache.

6. The method of claim 1, further comprising:
    transferring first data from the entry of the second cache to a third cache; and selecting data for replacement at the third cache without regard to a validity status of the entry of the second cache.

7. A method, comprising:
tracking, at a first cache controller associated with a first cache of a processing system, a validity status of an entry of a second cache;
selecting, at the processing system, data from the first cache for eviction by the first cache controller in response to the validity status of the entry of the second cache tracked by the first cache controller indicating invalid data; and
selecting the data from the first cache in response to identifying that the data is to be stored at the entry of the second cache.

8. The method of claim 7, further comprising:
identifying the validity status of the entry at the second cache as invalid when data is transferred from the entry at the second cache to the first cache.

9. The method of claim 7, further comprising:
transferring the data selected for eviction from the first cache to the second cache.

10. The method of claim 7, wherein selecting data from the first cache for eviction further is based in part on an age value of the data at the first cache.

11. A processor, comprising:
a first cache;
a second cache; and
a first cache controller configured to:
set a validity status of an entry of the first cache to an invalid state in response to transferring first data from the entry of the first cache to an entry of the second cache;
select second data at the second cache for replacement in response to the validity status of the entry of the first cache indicating the invalid state; and
transfer the second data selected for replacement from the second cache to the first cache.

12. The processor of claim 11, wherein the first cache controller is further configured to:
select the second data at the second cache for replacement in response to a memory access request received at the second cache subsequent to transferring the first data from the entry of the first cache to the entry of the second cache.

13. The processor of claim 12, wherein the first cache controller is further configured to:
store the validity status of the entry of the first cache; and
select the second data based on the stored validity status.

14. The processor of claim 13, wherein the first cache controller is further configured to:
update the stored validity status in response to an indication that data has been stored at the entry of the first cache.

15. The processor of claim 11, wherein the first cache controller is further configured to:
select the second data for replacement further based on an age value of an entry of the second cache.

16. The processor of claim 11, further comprising:
a third cache, wherein the first cache controller is configured to transfer the first data from the entry of the second cache to an entry of the third cache; and
a second cache controller configured to select data for replacement at the third cache.

* * * * *